(12) United States Patent
Samie et al.

(10) Patent No.: US 8,454,466 B2
(45) Date of Patent: Jun. 4, 2013

(54) HYBRID POWERTRAIN SYSTEM USING SELECTABLE ONE-WAY CLUTCHES

(75) Inventors: Farzad Samie, Franklin, MI (US); Chi-Kuan Kao, Troy, MI (US); Norman K. Bucknor, Troy, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 12/961,595

(22) Filed: Dec. 7, 2010

(65) Prior Publication Data

US 2012/0142472 A1 Jun. 7, 2012

(51) Int. Cl.
 *F16H 37/06* (2006.01)
(52) U.S. Cl.
 USPC .............................................. 475/8
(58) Field of Classification Search
 USPC ......................................... 475/8, 5
 See application file for complete search history.

(56) References Cited

U.S. PATENT DOCUMENTS

| | | | |
|---|---|---|---|
| 6,244,965 B1 | 6/2001 | Klecker et al. | |
| 6,739,440 B1 | 5/2004 | Dick | |
| 2003/0199353 A1 * | 10/2003 | Bowen | 475/5 |
| 2005/0130789 A1 | 6/2005 | Samie et al. | |
| 2008/0169165 A1 | 7/2008 | Samie | |
| 2008/0223681 A1 | 9/2008 | Stevenson et al. | |
| 2009/0084653 A1 | 4/2009 | Holmes | |
| 2009/0098970 A1 * | 4/2009 | Kimes | 475/5 |
| 2010/0063693 A1 | 3/2010 | Lee et al. | |
| 2010/0063694 A1 | 3/2010 | Lee et al. | |
| 2010/0063698 A1 | 3/2010 | Lee et al. | |
| 2012/0149518 A1 * | 6/2012 | Kimes | 475/5 |

* cited by examiner

*Primary Examiner* — Sherry Estremsky

(57) ABSTRACT

A hybrid powertrain system includes first and second torque machines, a differential gear set including first, second and third elements, an output member, and first, second, and third selectable one-way clutches (SOWC). The first SOWC is configurable to prevent rotation of the third element of the differential gear set in a first rotational direction when controlled to a first activated state, and configurable to prevent rotation of the third element of the differential gear set in a second rotational direction opposite the first rotational direction when controlled to a second activated state. The first torque machine is coupled to the third element of the differential gear set only when the second SOWC is controlled to one of the activated states. And, the third element of the differential gear set is coupled to the input member only when the second and third SOWCs are each controlled to one of the activated states.

17 Claims, 2 Drawing Sheets

HYBRID POWERTRAIN SYSTEM USING SELECTABLE ONE-WAY CLUTCHES

TECHNICAL FIELD

This disclosure is related to hybrid powertrain systems.

BACKGROUND

The statements in this section merely provide background information related to the present disclosure and may not constitute prior art.

Known hybrid powertrain systems use torque machines employing one of two or more energy conversion processes to generate tractive torque, which may be used for vehicle propulsion. Known torque machines include internal combustion engines that convert fossil fuels to torque using combustion processes, and electric machines that convert stored electrical energy to torque using electro-magnetic processes. Other known torque machines may include, e.g., hydraulically powered torque machines and pneumatically powered torque machines.

Known hybrid powertrain systems use transmission devices to transfer torque between the torque machines and an output member connected to a driveline when the powertrain is applied to a vehicle. Known transmission devices employ differential gears and selectively activated torque transfer clutches to control and change speed ratios and to transfer torque between the torque machines and the output member. Known torque transfer clutches generally include hydraulically-activated wet clutches. The torque transfer clutches include multi-plate friction clutches that have parasitic spin losses caused in part by fluid that resists rotation of clutch elements when a clutch is deactivated. Hydraulic systems include hydraulic pumps and pressurized fluid transfer systems to transfer pressurized hydraulic fluid to activate the torque transfer clutches. Hydraulic systems also include valve bodies, which are bulky and difficult to manufacture. Known hydraulic pumps are mechanically-driven devices that use power originating from the engine. Known hybrid powertrain systems may use an electrically-powered hydraulic pump to provide supplemental hydraulic pressure when the engine is off during ongoing powertrain operation. It is known that hydraulic circuits and hydraulic clutch elements add weight to a powertrain system and consume power. Known one-way clutch devices have been applied to effect torque transfer in powertrain systems. Known powertrain systems include a control system to monitor various inputs from the vehicle and the operator and provide operational control of the powertrain. This may include controlling transmission operating state and gear shifting, controlling torque-generative devices, and regulating the power interchange among the energy storage device and the torque machines to manage outputs of the transmission, including torque and rotational speed.

SUMMARY

A hybrid powertrain system includes an input member, first and second torque machines, a differential gear set including first, second and third elements, an output member, and first, second, and third selectable one-way clutches (SOWC), each operative in one of a respective deactivated state and a respective plurality of activated states. The second torque machine is rotatably coupled to the first element of the differential gear set, and the output member is rotatably coupled to the second element of the differential gear set. The first SOWC is configurable to prevent rotation of the third element of the differential gear set in a first rotational direction when controlled to a first one of the respective plurality of activated states, and configurable to prevent rotation of the third element of the differential gear set in a second rotational direction opposite the first rotational direction when controlled to a second one of the respective plurality of activated states. The first torque machine is coupled to the third element of the differential gear set only when the second SOWC is controlled to one of the respective plurality of activated states. And, the third element of the differential gear set coupled to the input member only when the second and third SOWCs are each controlled to one of the respective plurality of activated states.

BRIEF DESCRIPTION OF THE DRAWINGS

One or more embodiments will now be described, by way of example, with reference to the accompanying drawings, wherein.

DETAILED DESCRIPTION

Figure 1:
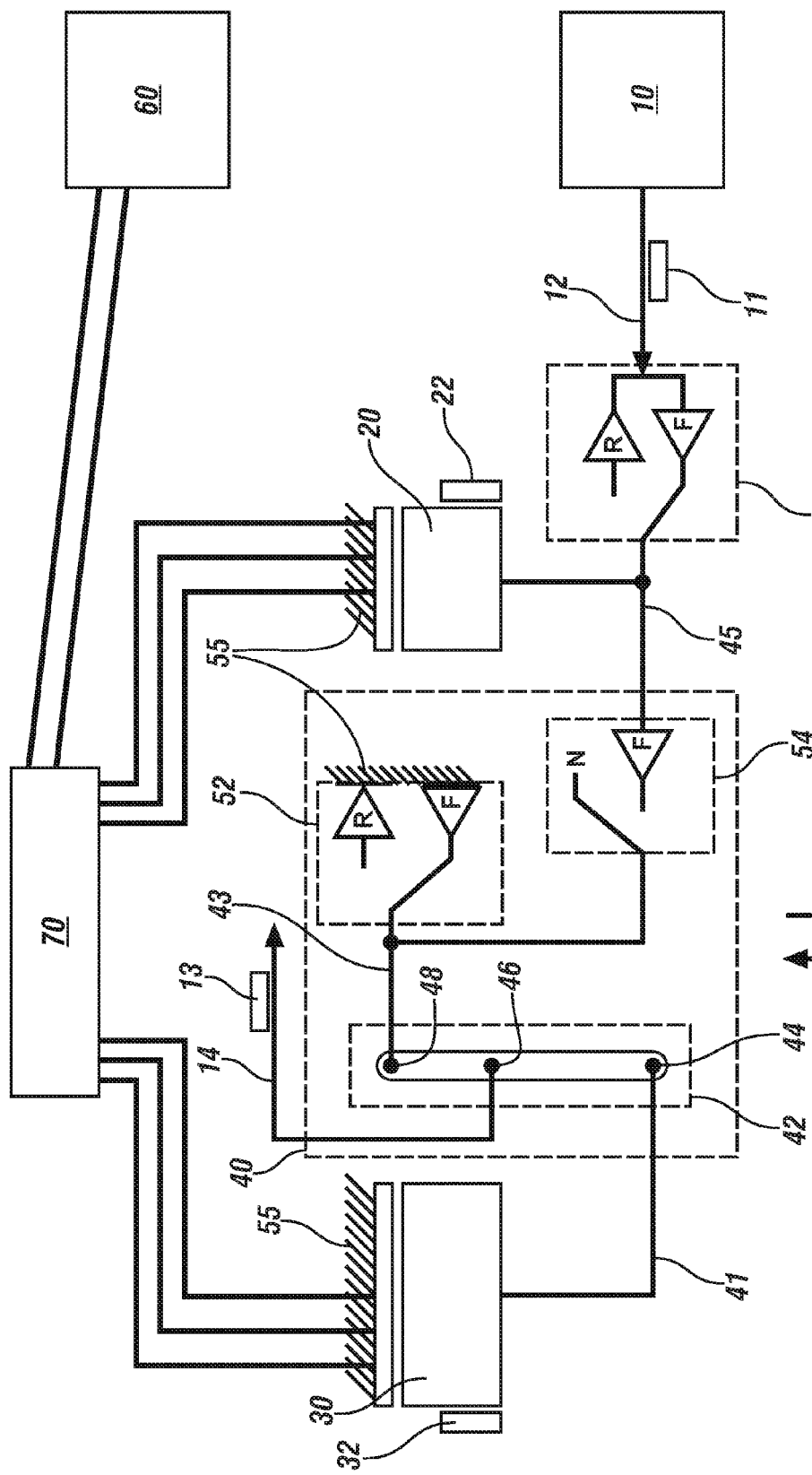
FIG. 1 is a schematic diagram of a hybrid powertrain system including an internal combustion engine, a transmission, and first and second torque machines, in accordance with the disclosure.

Referring now to the drawing, wherein the showings are for the purpose of illustrating certain exemplary embodiments only and not for the purpose of limiting the same, FIG. 1 schematically illustrates a hybrid powertrain system including an internal combustion engine 10, a transmission 40, first and second torque machines 20 and 30, respectively, and a control module 100. An energy storage device 60 electrically couples to an inverter module 70, preferably via a high-voltage DC bus connection. The inverter module 70 electrically couples to the first and second torque machines 20 and 30, respectively, to convert and transfer electric power for torque generation and electric power generation.

The internal combustion engine 10 mechanically couples to the transmission 40 via input member 12, and may include any suitable internal combustion engine. The first and second torque machines 20 and 30 are machines that convert stored energy to torque, and preferably include known multiphase electric motor/generators. The first and second torque machines 20 and 30 are equipped with rotational position sensors 22 and 32, respectively, e.g., resolvers, to monitor rotational positions and speeds.

The transmission 40 is housed in a transmission case or housing 55 and is configured as described herein to effect torque transfer between the input member 12, the first and second torque machines 20 and 30, and an output member 14. Preferably the input member 12 is coupled to an output member of the internal combustion engine 10. A suitable rotational position sensor 11 is configured to monitor rotational position and speed of the input member 12. A suitable rotational position sensor 13 is configured to monitor rotational position and speed of the output member 14. Preferably, the output member 14 of the transmission 40 is coupled to a driveline to transfer tractive torque to one or a plurality of drive wheels or another suitable powered device.

The transmission 40 preferably includes a differential gear set 42, which is a planetary gear set in one embodiment having a plurality of meshingly engaged elements including a sun gear 44, a planet carrier element 46 including a plurality of planet gears and associated interconnecting carrier, and a ring gear 48. Other suitable differential gear arrangements may also be employed to similar effect. The transmission 40 includes a plurality of selectable one-way clutches (SOWCs) including a first SOWC 52, a second SOWC 54, and a third SOWC 56 that effect various torque transfers between and among the first and second torque machines 20, 30, the engine 10, and the output member 14. No other clutching mechanisms are used.

The first torque machine 20 rotatably couples to a rotating shaft element 45. The second torque machine 30 rotatably couples via a shaft element 41 to the sun gear 44. The output member 14 rotatably couples to the planet carrier element 46. The first SOWC 52 is configured to mechanically ground rotation of the ring gear 48 to the transmission case 55 (which serves as the mechanical ground) in one of a first rotational direction and a second, opposing rotational direction, as described herein. The second SOWC 54 is configured to couple shaft element 45 to shaft element 43 when activated, and thus couples the first torque machine 20 to the ring gear 48 when activated. The second SOWC 54 decouples the first torque machine 20 from the ring gear 48 when deactivated. The third SOWC 56 couples the input member 12 to the shaft element 45 when activated, and thus couples the engine 10 to the first torque machine 20 when activated. The third SOWC 56 decouples the first torque machine 20 from the input member 12 and thus from the engine 10 when deactivated. The input member 12 and thus the engine 10 is coupled to the ring gear 48 only when both the second SOWC 54 and the third SOWC 56 are activated. The first SOWC 52, the second SOWC 54 and the third SOWC 56 are preferably electromechanically-activated selectable one-way clutches (SOWC) that are operatively connected to the control module 100.

The control module 100 is signally connected to each of the rotational position sensors 11, 13, 22 and 32. The control module 100 is operatively connected to each of the first torque machine 20, the second torque machine 30, and the engine 10 to control operation and power outputs therefrom. The control module 100 is operatively connected to each of the first SOWC 52, the second SOWC 54, and the third SOWC 56 to control activation and deactivation thereof.

Figure 2:
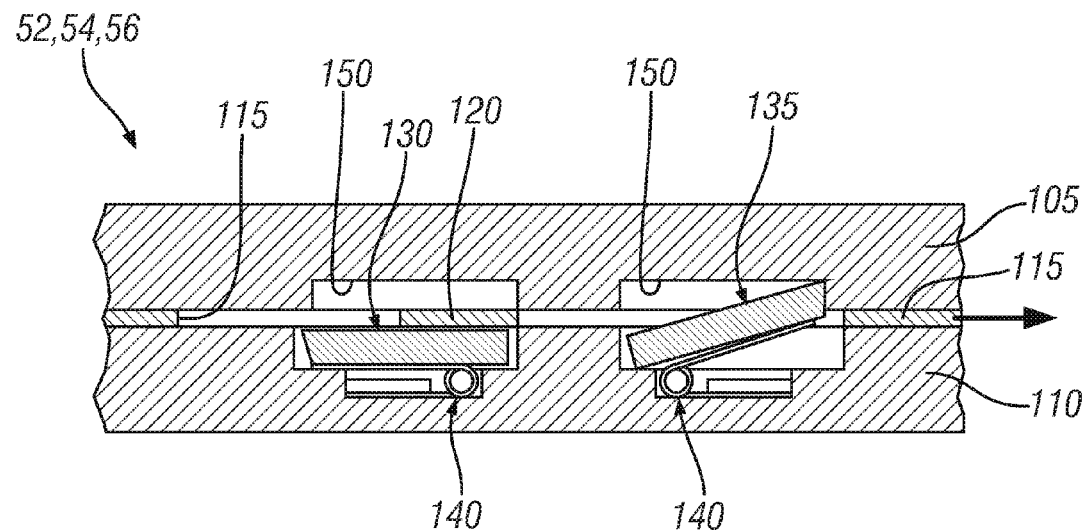
FIG. 2 schematically shows a cross-section of a portion of an exemplary SOWC, in accordance with the disclosure.

FIG. 2 schematically shows a cross-section of a portion of an exemplary electromechanically-activated selectable one-way clutch (SOWC), which preferably includes the first SOWC 52, the second SOWC 54 and the third SOWC 56, as depicted in FIG. 1. The exemplary SOWC includes coaxial first and second members 105 and 110, respectively, with a coaxial moveable selector plate 115 interposed therebetween. The first member 105, the second member 110 and the moveable selector plate 115 are preferably flat circular plates. The moveable selector plate 115 includes an activation element 120, which is a suitable controllable actuator, e.g., an electromagnetic solenoid device, configured to control the position of the moveable selector plate 115. The control module 100 operatively connects to the activation element 120 to effect control. The first coaxial member 105 includes a plurality of recesses 150. The second coaxial member 110 includes a corresponding plurality of engagement elements 130 and 135, consisting of struts, sprags, or rollers that are biased outwardly using springs 140. The activation element 120 includes a plurality of windows and blocking elements.

The exemplary SOWC may be controlled to operate in one of a deactivated state and a plurality of activated states by adjusting position of the moveable selector plate 115. When the moveable selector plate 115 is controlled to a first position, the selector plate 115 physically retracts all the engagement elements 130 and 135 and the SOWC is deactivated, resulting in no torque transfer between the first and second members 105 and 110 in either rotational direction (i.e. freewheeling state). When the moveable selector plate 115 is controlled to a second position, specific windows in the selector plate 115 permit the engagement elements 130 to project and specific blocking elements in the selector plate 115 retract the engagement elements 135. As such, the engagement elements 130 engage and mechanically interfere with the corresponding recesses 150 in the second coaxial member 110 to transfer torque in a first rotational direction, but will not transfer torque in a second, opposite rotational direction (i.e. one-way torque transfer state). Similarly, when the moveable selector plate 115 is controlled to a third position, specific windows in the selector plate 115 permit the engagement elements 135 to project and specific blocking elements in the selector plate 115 retract the engagement elements 130. As such, the engagement elements 135 engage the corresponding recesses 150 in the second coaxial member 110 to transfer torque in the second rotational direction, but will not transfer torque in the first rotational direction (i.e. one-way torque transfer state). When the moveable selector plate 115 is controlled to a fourth position, windows in the selector plate 115 permit the engagement elements 130 and the engagement elements 135 to project to engage the corresponding recesses 150 in the second coaxial member 110 to transfer torque in both the first and second rotational directions (i.e locked state).

The first SOWC 52, the second SOWC 54 and the third SOWC 56 may each be configured to operate in one of a deactivated state or one of a plurality of available activated states. The deactivated state is a free-wheel state, with the moveable selector plate 115 controlled to the first position and the first member 105 decoupled from the second member 110. When the SOWC is deactivated, there is no torque transferred in either rotational direction.

The activated states include one-way torque transfer states and a locked state. The one-way torque transfer states include one-way operating states wherein the SOWC is activated to transfer torque in only one direction, with the first member 105 coupled to the second member 110 to transfer torque in one of the two rotational directions. The one-way torque transfer states include a first, forward control state (F) and a second, reverse control state (R). The first, forward control state (F) includes the SOWC activated with the moveable selector plate 115 controlled to the second position. In the first, forward control state (F), torque may be transferred between the first member 105 and the second member 110 when torque is applied in a first rotational direction. However, when torque is applied in a second rotational direction opposite the first rotational direction, no torque is transferred and the SOWC free-wheels. The second, reverse control state (R) includes the SOWC activated with the moveable selector plate 115 controlled to the third position. In the second, reverse control state (R), torque may be transferred between the first member 105 and the second member 110 when torque is applied in the second rotational direction. However, when torque is applied in the first rotational direction opposite the second rotational direction, no torque is transferred, and the SOWC free-wheels. The third activated state is the locked state, which includes the SOWC activated with the moveable selector plate 115 controlled to the fourth position. The first member 105 is coupled to the second member 110 to transfer torque when torque is applied in either of the two rotational directions.

Alternatively, one of the SOWCs may be configured to operate in one of two states, which is depicted with reference to the second SOWC 54 in FIG. 1. The two states preferably include the deactivated state (labeled N) and the forward control state (F). As such, torque may be transferred between the first member 105 and the second member 110 when torque is applied in the first rotational direction, and no torque is transferred and the SOWC free-wheels when torque is applied in the second rotational direction. When the second SOWC 54 is configured as described, power losses for the first torque machine 20 and the engine 10 associated with friction, spin and inertia are decoupled from the powertrain system and only affect powertrain performance when the first torque machine 20 and/or the engine 10 are generating torque that is being transferred to the transmission 40.

The control module 100 includes control schemes for changing the first SOWC 52, the second SOWC 54, and the third SOWC 56 amongst the operating states including the deactivated state and the plurality of activated states. As is appreciated, the process of activating and deactivating any clutch requires managing rotational speeds of the affected elements and associated members of the affected clutch and managing torque transfer across the affected clutch. This includes off-loading all or a portion of the transferred torque prior to deactivating the affected clutch, and synchronizing rotational speeds of the clutch members, e.g., first and second members 105 and 110, prior to activating the affected clutch. When the affected clutch is one of the SOWCs described herein, substantially all the transferred torque must be off-loaded prior to deactivating the clutch. When the clutch is the SOWC described herein, rotational speeds of the clutch members must be synchronized prior to activation. The control schemes in the control module 100 control operation of the torque generating elements, e.g., the internal combustion engine 10 and the first and second torque machines 20 and 30, including controlling torques and rotational speeds thereof to effect a change in state of one of the SOWCs.

The internal combustion engine 10 is preferably configured to execute autostop and autostart events to automatically stop and restart operation during ongoing powertrain operation in response to states of vehicle and powertrain operating conditions including a state of charge of the energy storage device 60 and operator inputs. The operator inputs preferably include an operator input to an accelerator pedal. It is appreciated that ongoing powertrain operation refers to a period of operation during which an operator has requested vehicle operation using an ignition key or another suitable command, often referred to as key-on. By way of a non-limiting example, the autostart event is executed to automatically start the engine 10 when a state of charge of the energy storage device 60 is less than a predetermined threshold. The autostart event includes suitable control commands for the first torque machine 20 to generate torque to spin the engine 10, suitable control commands to activate the third SOWC 56 in one of the one-way torque transfer states to effect torque transfer between the first torque machine 20 and the engine 10, and suitable engine control commands associated with delivering fuel and spark to fuel, fire, and operate the engine 10.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Various powertrain operating states are achievable for operating the powertrain system configured as described with reference to FIG. 1 by selective activation of the first SOWC 52 (SOWC 1), the second SOWC 54 (SOWC 2) and the third SOWC 56 (SOWC 3), as depicted in Table 1.

TABLE 1

| Powertrain Operating State | SOWC 1 52 | SOWC 2 54 | SOWC 3 56 |
| --- | --- | --- | --- |
| Reverse | R | | |
| EV1 | F | | |
| EV2 | | F or X | |
| Series—Engine On | F | | F or X |
| Load Sharing—Engine On | | F or X | F or X |
| Engine Start | | | R |

In Table 1, X indicates that the selected SOWC is activated in the third, locked state F indicates that the selected SOWC is activated in the first, forward control state, and R indicates that the selected SOWC is activated in the second, reverse control state. When there is no indicator associated with one of the SOWCs, it indicates that the designated SOWC is deactivated, i.e., in the deactivated state.

Rotational directions as used herein below with respect to the differential gearset 42 include a first rotational direction and a second rotational direction that is opposite the first rotational direction. As configured, the planet carrier element 46 rotating in the second direction corresponds to the output member also rotating in the second direction which corresponds to vehicle driveline rotation consistent with reverse motion of the vehicle. Similarly, the planet carrier element 46 rotating in the first direction corresponds to the output member also rotating in the first direction which corresponds to vehicle driveline rotation consistent with forward motion of the vehicle.

The hybrid powertrain system operates in a single motor electric vehicle operating state to propel the vehicle in a reverse direction (Reverse) with the second torque machine 30 controlled to transfer torque via the differential gear set 42 to rotate the output member 14 in the second direction when the first SOWC 52 is activated in the second, reverse control state (R) to ground rotation of the ring gear 48 to the transmission case 55 in the first rotational direction. The second SOWC 54 and the third SOWC 56 are deactivated. The engine 10 is preferably off.

The hybrid powertrain system operates in a single motor electric vehicle (EV1) operating state to propel the vehicle in a forward direction with the second torque machine 30 controlled to transfer torque via the differential gear set 42 to rotate the output member 14 in the first direction when the first SOWC 52 is activated in the first, forward control state (F) to ground rotation of the ring gear 48 to the transmission case 55 in the second rotational direction. The second SOWC 54 and the third SOWC 56 are deactivated. The engine 10 is preferably off.

The hybrid powertrain system operates in a dual motor electric vehicle (EV2) operating state with the second torque machine 30 controlled to transfer torque via the sun gear 44 and the first torque machine 20 controlled to transfer torque via the ring gear 48 to rotate the output member 14 in the first direction when the second SOWC 54 is activated in either the first, forward control state (F) or the third, locked state (X) to couple rotation of the first torque machine 20 to the ring gear 48. The first SOWC 52 and the third SOWC 56 are deactivated. The engine 10 is preferably off.

The hybrid powertrain system operates in an engine-assisted EV (Load Sharing—Engine On) operating state with the second torque machine 30 controlled to transfer torque via the sun gear 44, and the engine 10 and the first torque machine 20 controlled to transfer torque via the ring gear 48 to rotate the output member 14 in the first direction when the second SOWC 54 and the third SOWC 56 are activated in either the first, forward control state (F) or the third, locked state (X). The first SOWC 52 is deactivated. The engine 10 is preferably on. The engine-assisted EV operating state allows powertrain operation when a fault occurs that causes an interruption in electric power flow to the first and second torque machines 20 and 30, e.g., a high-voltage power loss.

The hybrid powertrain system operates in a series (Series-Engine On) operating state with the second torque machine 30 controlled to transfer torque via the sun gear 44 to rotate the output member 14 when the first SOWC 52 is activated in the first, forward control state (F). The second SOWC 54 is deactivated. The third SOWC 56 is activated in either the first, forward control state (F) or the third, locked state (X) and the engine 10 is preferably on and generating power that is transferred to the first torque machine 20, which is operating in an electric power generating state.

In the engine-start (Engine Start) operating state, the third SOWC 56 is activated in the second, reverse control state (R) to transfer torque only in the second rotational direction. The first torque machine 20 operates to transfer torque to rotate the input member 12 coupled to the internal combustion engine 10 in the second rotational direction to effect engine starting including during engine autostart events. In this operating state the second SOWC 54 is deactivated, and thus freewheels. The first SOWC 52 may be either activated in either the first, forward control state (F) or the second, reverse control state (R), or it may be deactivated, depending upon other conditions. The other operating conditions used to determine the operating state of the first SOWC 52 include whether an engine start command is in response to a key-on command by an operator, or whether there is a commanded autostart operation with the vehicle presently operating. The third SOWC 56 is activated in the second, reverse control state (R) to transfer torque only in the second rotational direction, and does not transfer torque in the first rotational direction. This configuration permits engine speed flaring associated with initial engine firing without causing an associated torque disturbance that includes torque transfer to the differential gear 42 in the hybrid powertrain system.

The hybrid powertrain system as described allows a transmission, e.g., transmission 40, to be configured using only SOWCs for torque transfer, thus eliminating a need for hydraulically activated disc clutches and an associated high-pressure pump and high-pressure hydraulic circuit. A low pressure electrically-powered hydraulic pump may be employed for lubrication. This serves to reduce or eliminate parasitic losses associated with hydraulic systems. This also serves to reduce powertrain mass. With these changes, an analysis has shown an improvement in composite fuel economy of about 8% over an FTP cycle when pump and clutch losses are reduced by 50 and 90 percent, respectively, in one embodiment. When the powertrain system is employed on a plug-in hybrid electric vehicle (PHEV), the distance range may be improved by about 4%.

The control module 100 is configured to control rotational speeds and torque outputs of the first and second torque machines 20, 30 by controlling electric power transfer thereto, using speed inputs monitored using the associated resolvers 22, 32 and the input and output rotational sensors 11, 13 as feedback for control purposes.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Hybrid powertrain system, comprising:
an input member,
first and second torque machines,
a differential gear set including first, second and third elements,
an output member,
first, second, and third selectable one-way clutches (SOWC), each operative in one of a respective deactivated state and a respective plurality of activated states;
the second torque machine rotatably coupled to the first element of the differential gear set;
the output member rotatably coupled to the second element of the differential gear set;
the first SOWC configurable to prevent rotation of the third element of the differential gear set in a first rotational direction when controlled to a first one of the respective plurality of activated states;
the first SOWC configurable to prevent rotation of the third element of the differential gear set in a second rotational direction opposite the first rotational direction when controlled to a second one of the respective plurality of activated states;
the first torque machine coupled to the third element of the differential gear set only when the second SOWC is controlled to one of the respective plurality of activated states; and
the third element of the differential gear set coupled to the input member only when the second and third SOWCs are each controlled to one of the respective plurality of activated states.

2. The hybrid powertrain system of claim 1, comprising a first single torque machine operating state to rotate the output member in the first rotational direction wherein the first SOWC is controlled to the first one of the respective plurality of activated states, and the second SOWC is controlled to the respective deactivated state.

3. The hybrid powertrain system of claim 2, comprising a second single torque machine operating state to rotate the output member in the second rotational direction wherein the first SOWC is controlled to the second one of the respective plurality of activated states, and the second SOWC is controlled to the respective deactivated state.

4. The hybrid powertrain system of claim 1, comprising a dual torque machine operating state to rotate the output member in the first rotational direction wherein the first SOWC is controlled to the respective deactivated state, the second SOWC is controlled to one of the respective plurality of activated states, and the third SOWC is controlled to the respective deactivated state.

5. The hybrid powertrain system of claim 1, comprising an input assisted operating state to rotate the output member in the first rotational direction wherein the first SOWC is controlled to the respective deactivated state, the second SOWC is controlled to one of the respective plurality activated states, and the third SOWC is controlled to one of the respective plurality of activated states.

6. The hybrid powertrain system of claim 1, comprising a series operating state to rotate the output member in the first rotational direction wherein the first SOWC is controlled to the first one of the respective plurality of activated states, the second SOWC is controlled to the respective deactivated state, and the third SOWC is controlled to one of the respective plurality of activated states.

7. The hybrid powertrain system of claim 6, wherein the one of the respective plurality of activated states corresponding to the third SOWC only transfers torque from the input member in the first rotational direction.

8. The hybrid powertrain system of claim 1, comprising an engine starting operating state to rotate the input member in the first rotational direction wherein the third SOWC is controlled to one of the respective plurality of activated states that only transfers torque to the input member in the first rotational direction.

9. Hybrid powertrain system, comprising:
an internal combustion engine;
a planetary gear set including a sun gear rotatable in a first rotational direction and in a second rotatable direction that is opposite to the first rotatable direction, a planet gear carrier rotatable in the first rotational direction and in the second rotatable direction, and a ring gear rotatable in the first rotational direction and in the second rotatable direction;
a vehicle driveline coupled to the planet gear carrier;
first and second electric machines, said second electric machine coupled to the sun gear;
a first selectable one-way clutch (SOWC) coupled between the ring gear and a mechanical ground, said first SOWC comprising a respective free-wheeling state having no effective torque capacity in either the first rotational direction or the second rotational direction, a respective first one-way torque transfer state having effective torque capacity in the first rotational direction and no effective torque capacity in the second rotational direction, and a respective second one-way torque transfer state having no effective torque capacity in the first rotational direction and effective torque capacity in the second rotational direction;
a second selectable SOWC coupled between the ring gear and the first electric machine, said second SOWC comprising a respective free-wheeling state having no effective torque capacity in either the first rotational direction or the second rotational direction, and a respective first one-way torque transfer state having effective torque capacity in the first rotational direction and no effective torque capacity in the second rotational direction; and
a third selectable SOWC coupled between the first electric machine the internal combustion engine, said third SOWC comprising a respective free-wheeling state having no effective torque capacity in either the first rotational direction or the second rotational direction, a respective first one-way torque transfer state having effective torque capacity in the first rotational direction and no effective torque capacity in the second rotational direction, and a respective second one-way torque transfer state having no effective torque capacity in the first rotational direction and effective torque capacity in the second rotational direction.

10. The hybrid powertrain system of claim 9, wherein the second SOWC further comprises a respective locked state having effective torque capacity in both the first rotational direction and the second rotational direction.

11. The hybrid powertrain system of claim 9, wherein the third SOWC further comprises a respective locked state having effective torque capacity in both the first rotational direction and the second rotational direction.

12. The hybrid powertrain system of claim 9, comprising a first single electric machine operating state to rotate the planet gear carrier in the first rotational direction when the first SOWC is controlled to the respective first one-way torque transfer state, and the second SOWC is controlled to the respective free-wheeling state.

13. The hybrid powertrain system of claim 12, comprising a second single electric machine operating state to rotate the planet gear carrier in the second rotational direction when the first SOWC is controlled to the respective second one-way torque transfer state, and the second SOWC is controlled to the respective free-wheeling state.

14. The hybrid powertrain system of claim 9, comprising a dual electric machine operating state to rotate the planet carrier in the first rotational direction when the first SOWC is controlled to the respective free-wheeling state, the second SOWC is controlled to the respective first one-way torque transfer state, and the third SOWC is controlled to the respective free-wheeling state.

15. The hybrid powertrain system of claim 9, comprising an input assisted operating state to rotate the planet carrier in the first rotational direction when the first SOWC is controlled to the respective free-wheeling state, the second SOWC is controlled to the respective first one-way torque transfer, and the third SOWC is activated is controlled to the respective first one-way torque transfer state.

16. The hybrid powertrain system of claim 9, comprising a series operating state to rotate the planet carrier in the first rotational direction when the respective first SOWC is controlled to the first one-way torque transfer state, the second SOWC is controlled to the respective free-wheeling state, and the third SOWC is controlled to respective first one-way torque transfer state.

17. Hybrid powertrain system, comprising:
an internal combustion engine;
a planetary gear set including a sun gear rotatable in a first rotational direction and in a second rotatable direction that is opposite to the first rotatable direction, a planet gear carrier rotatable in the first rotational direction and in the second rotatable direction, and a ring gear rotatable in the first rotational direction and in the second rotatable direction;
a vehicle driveline coupled to the planet gear carrier;
first and second electric machines, said second electric machine coupled to the sun gear;
a first selectable one-way clutch (SOWC) coupled between the ring gear and a mechanical ground, said first SOWC comprising a respective free-wheeling state having no effective torque capacity in either the first rotational direction or the second rotational direction, a respective first one-way torque transfer state having effective torque capacity in the first rotational direction and no effective torque capacity in the second rotational direction, and a respective second one-way torque transfer state having no effective torque capacity in the first rotational direction and effective torque capacity in the second rotational direction;

a second selectable SOWC coupled between the ring gear and the first electric machine, said second SOWC comprising a respective free-wheeling state having no effective torque capacity in either the first rotational direction or the second rotational direction, and a respective first one-way torque transfer state having effective torque capacity in the first rotational direction and no effective torque capacity in the second rotational direction;

a third selectable SOWC coupled between the first electric machine the internal combustion engine, said third SOWC comprising a respective free-wheeling state having no effective torque capacity in either the first rotational direction or the second rotational direction, a respective first one-way torque transfer state having effective torque capacity in the first rotational direction and no effective torque capacity in the second rotational direction, and a respective second one-way torque transfer state having no effective torque capacity in the first rotational direction and effective torque capacity in the second rotational direction;

a first single electric machine operating state to rotate the planet gear carrier in the first rotational direction when the first SOWC is controlled to the respective first one-way torque transfer state, and the second SOWC is controlled to the respective free-wheeling state;

a second single electric machine operating state to rotate the planet gear carrier in the second rotational direction when the first SOWC is controlled to the respective second one-way torque transfer state, and the second SOWC is controlled to the respective free-wheeling state;

a dual electric machine operating state to rotate the planet carrier in the first rotational direction when the first SOWC is controlled to the respective free-wheeling state, the second SOWC is controlled to the respective first one-way torque transfer state, and the third SOWC is controlled to the respective free-wheeling state;

an input assisted operating state to rotate the planet carrier in the first rotational direction when the first SOWC is controlled to the respective free-wheeling state, the second SOWC is controlled to the respective first one-way torque transfer, and the third SOWC is activated is controlled to the respective first one-way torque transfer state; and a series operating state to rotate the planet carrier in the first rotational direction when the respective first SOWC is controlled to the first one-way torque transfer state, the second SOWC is controlled to the respective free-wheeling state, and the third SOWC is controlled to respective first one-way torque transfer state.

* * * * *